(12) United States Patent  
Rupin et al.

(10) Patent No.: US 11,081,243 B2  
(45) Date of Patent: Aug. 3, 2021

(54) DEVICE FOR CONTROLLING AND MEASURING WELDING DEFECTS ON A CYLINDRICAL WALL AND METHOD IMPLEMENTING SAME

(71) Applicants: Electricite de France, Paris (FR); COMMISSARIAT A L'ENERGIE ATOMIQUE ET AUX ENERGIES ALTERNATIVES, Paris (FR)

(72) Inventors: Fabienne Rupin, Vernou la Celle (FR); Guillemette Ribay, Bourg la Reine (FR)

(73) Assignees: Electricite de France; COMMISSARIAT A L'ENERGIE ATOMIQUE ET AUX ENERGIES ALTERNATIVES

(\*) Notice: Subject to any disclaimer, the term of this patent is extended or adjusted under 35 U.S.C. 154(b) by 269 days.

(21) Appl. No.: 16/060,673

(22) PCT Filed: Dec. 19, 2016

(86) PCT No.: PCT/EP2016/081695  
§ 371 (c)(1),  
(2) Date: Jun. 8, 2018

(87) PCT Pub. No.: WO2017/103253  
PCT Pub. Date: Jun. 22, 2017

(65) Prior Publication Data  
US 2018/0277266 A1    Sep. 27, 2018

(30) Foreign Application Priority Data

Dec. 18, 2015 (FR) ..................................... 1562722

(51) Int. Cl.  
*G01N 29/04* (2006.01)  
*G01N 29/06* (2006.01)  
(Continued)

(52) U.S. Cl.  
CPC ......... *G21C 17/002* (2013.01); *G01N 29/043* (2013.01); *G01N 29/221* (2013.01);  
(Continued)

(58) Field of Classification Search  
CPC .................. G01N 29/043; G01N 29/2487  
See application file for complete search history.

(56) References Cited

U.S. PATENT DOCUMENTS 4,842,813 A    6/1989  Desfontaines et al.  
5,145,637 A *  9/1992  Richardson .......... G01N 27/902  
376/245

(Continued)

FOREIGN PATENT DOCUMENTS

CN    87101686 A     9/1987  
CN    201873082 U    6/2011  
(Continued)

OTHER PUBLICATIONS

Preliminary Search Report for French Application No. 1562722 dated Aug. 12, 2016; 2 pages.

(Continued)

*Primary Examiner* — Herbert K Roberts  
(74) *Attorney, Agent, or Firm* — Lerner, David, Littenberg, Krumholz & Mentlik, LLP

(57) ABSTRACT

A device and method for inspecting and measuring weld defects in a cylindrical wall of a cylindrical conduit. The device can include an inspection head forming a probe having a proximal end and a distal end along its longitudinal axis, and of which a first side called "inner side" is provided with at least one ultrasound wave transducer. The inspection head can include a second side, called "outer side" opposite the first side that has a curved surface in the form of a cylinder fraction, and wherein the curved surface of the second side has outward facing convexity. The wave trans- (Continued)

ducer can be formed of a series of juxtaposed elements, each element being both a transmitter and receiver, wherein a surface of the series is curved and in the form of a cylinder fraction, and wherein the surface of the series has outward facing concavity.

11 Claims, 10 Drawing Sheets

(51) Int. Cl.
*G01N 29/24* (2006.01)
*G21C 17/00* (2006.01)
*G01N 29/22* (2006.01)
*G01N 29/265* (2006.01)
*G21C 17/003* (2006.01)

(52) U.S. Cl.
CPC ....... *G01N 29/225* (2013.01); *G01N 29/2456* (2013.01); *G01N 29/2487* (2013.01); *G01N 29/265* (2013.01); *G21C 17/003* (2013.01); *G01N 29/045* (2013.01); *G01N 2291/106* (2013.01); *G01N 2291/267* (2013.01); *G01N 2291/2636* (2013.01)

(56) References Cited

U.S. PATENT DOCUMENTS

| | | | |
|---|---|---|---|
| 5,652,387 | A | 7/1997 | Dumont et al. |
| 7,293,461 | B1 * | 11/2007 | Girndt ............. G01N 29/04 73/336 |
| 2007/0253519 | A1 | 11/2007 | Meier et al. |
| 2009/0235749 | A1 * | 9/2009 | Ehara ............. G01N 29/07 73/622 |
| 2015/0124237 | A1 | 5/2015 | Zinn et al. |

FOREIGN PATENT DOCUMENTS

| | | |
|---|---|---|
| CN | 201876440 U | 6/2011 |
| CN | 202141698 U | 2/2012 |
| CN | 202661446 U | 1/2013 |
| CN | 103543203 A | 1/2014 |
| CN | 103969341 A | 8/2014 |
| CN | 104395739 A | 3/2015 |
| CN | 204302241 U | 4/2015 |
| EP | 1850127 A1 | 10/2007 |
| FR | 2717578 A1 | 9/1995 |
| JP | H07244033 A | 9/1995 |
| JP | 2000105225 A | 4/2000 |
| JP | 2004163125 A | 6/2004 |
| JP | 2011252759 A | 12/2011 |
| JP | 2013217770 A | 10/2013 |
| JP | 2014185895 A * | 10/2014 |
| JP | 2014185895 A | 10/2014 |
| JP | 6319823 B2 | 5/2018 |
| WO | 8102636 A1 | 9/1981 |

OTHER PUBLICATIONS

International Search Report for PCT/EP2016/081695 dated Apr. 13, 2017; 3 pages.

Poguet, J. et al., "Phased Array Technology Concepts, Probes and Application," 8th European Congress on Non Destructive Testing, Jun. 17-21, 2002, Barcelona, Spain, pp. 1-7.

Poguet, J. et al., "Enhanced resolution transducers for thick pieces untrasonic inspection: the FERMAT transducer concept," NDT. net—vol. 7, No. 5, May 2002, pp. 1-9 XP55295231A, URL:http:jjwww.ndt.netjarticlejv07n05jbaron/baron.htm.

Park, Joon Soo et al., "Development of Automated Nondestructive Inspection System for BMI Nozzles in Nuclear Vessel," Journal of the Korean Society for Nondestructive Testing, vol. 33, No. 1, 2013, pp. 26-33.

Chapuis, B. et al., "Zone sensitivity for the ultrasonic inspection of complex 3D geometries using CIVA software," 10th International Conference on NDE in Relation to Structural Integrity for Nuclear and Pressurized Components, Oct. 1-3, 2013, Cannes, France, pp. 1-8.

Miura, T. et al., "Development of Ultrasocnic and Eddy Current Testing techniques for Curved Structures," (Piping Insepction (Nozzles/Complex))10th International Conference on NDE in Relation to Structural Integrity for Nuclear and Pressurized Components, Oct. 1-3, 2013, Cannes, France, pp. 1-8.

Chardome, V. et al., "Development and Qualificationof a Procedure for the Mechanized Ultrasonic Examination of Structural Weld Overlays," 10th International Conference on NDE in Relation to Structural Integrity for Nuclear and Pressurized Components, Oct. 1-3, 2013, Cannes, France, pp. 1-5.

Search Report for 1st Chinese Office Action for Application No. 2016800745897 dated May 13, 2020; 3 pages.

Search Report for 2nd Chinese Office Action for Application No. 2016800745897 dated Jan. 26, 2021; 2 pages.

* cited by examiner

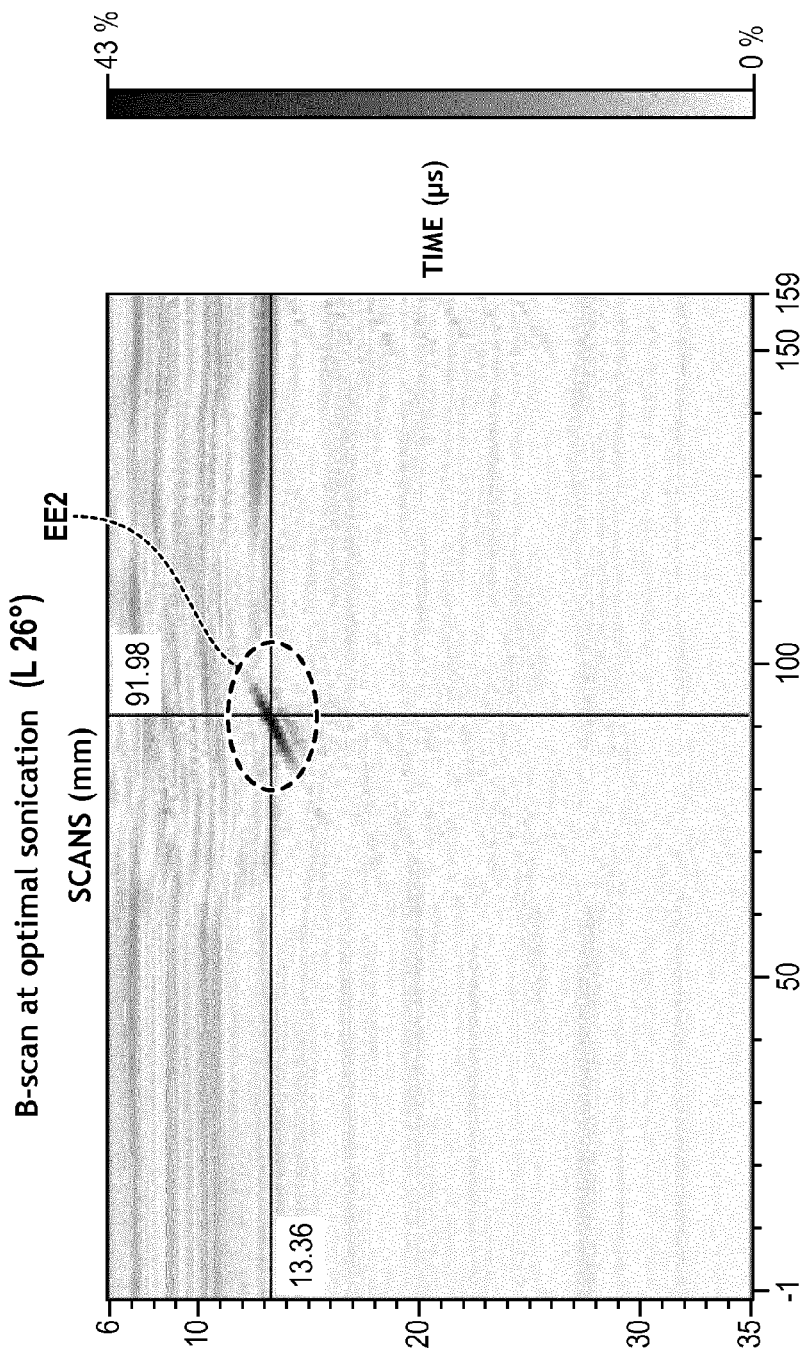

DEVICE FOR CONTROLLING AND MEASURING WELDING DEFECTS ON A CYLINDRICAL WALL AND METHOD IMPLEMENTING SAME

CROSS REFERENCE TO RELATED APPLICATIONS

The present application is a national phase entry under 35 U.S.C. § 371 of International Application No. PCT/EP2016/081695, filed Dec. 19, 2016, which claims priority from French Patent Application No. 1562722 filed Dec. 18, 2015, all of which are hereby incorporated herein by reference.

FIELD OF THE INVENTION

The present invention relates to a device for measuring welding defects and to a method implementing the same.

TECHNOLOGICAL BACKGROUND OF THE INVENTION

The operating of a nuclear reactor 1, such as the one illustrated in appended FIG. 1, requires measurement of neutron flux along the axial dimension of the fuel assemblies 10.

For the vast majority of reactors in operation, the instrumentation provided for this purpose uses probes 11 drawn by flexible pipes 12 which enter the hemispherical bottom 13 of the reactor vessel 1 called "vessel bottom", via a passageway known as a "Vessel Bottom Penetration" tube (or VBP) 14, of which a detailed illustration is given in FIG. 2.

These VBP tubes are welded to the inner shell of the vessel bottom 14. Typically, a 900 Mwe reactor in the French nuclear power station fleet comprises about fifty VBPs. Leakage at a VBP, notably due to defect of a weld 2, would amount to a break in the primary circuit of the reactor. The quality of tube welding guarantees good holding of the tubes in vertical position and also sealing of the vessel.

However, for measurement of damage to welds 2 a qualitative method is required.

The solving of this technical problem is increased through difficult accessibility having regard to the vessel-bottom positioning of the tubes and also to the topology in the vicinity of the welds. As shown in the Figure, the vessel bottom is mainly flat but is curved in the region of its periphery which means that the plane of the vessel does not always lie in a plane orthogonal to the vertically positioned tubes in the direction of the fuel assemblies.

As shown in FIG. 2, the strong radii of curvature of the vessel bottom are the reason for welds 2 of asymmetric shape around the welded tube. This asymmetry correlates with the angle $\alpha$ formed by the axis of the VBP and plane tangent to the inner shell 130 of the bottom 13. For example, this angle can vary from about 45° to 5° respectively from the ends of the vessel bottom 130 towards the centre thereof.

Probes for inspecting VBPs are available using devices accessing tubes from the outside. The area inspected by this family of probes is limited to the main part of the tubes and does not allow inspection of any type of defect in all VBPs.

So-called "TOFD" probes (Time of Flight Diffraction) for inspection from within the inside tubes are available and function by generating and measuring acoustic waves.

The method using these probes inspects a weld by using two "acoustic transducers" positioned either side of the weld. If there is any discontinuity in the weld, this will diffract some of the energy following the usual laws of acoustics. It is this diffracted energy that is recovered by the receiving transducer and that will be used to locate the discontinuity by measuring the "time of flight".

In addition, probes of "angle transducer" type are known to inspect these tubes on the inside. With this device, a single sensor is used both to transmit and to receive. It is placed on a wedge that is able to deflect the beam in a single direction following the laws of acoustics (Snell Descartes law).

With a sensor it is therefore possible to detect defects having an orientation allowing the return of acoustic energy towards the sensor, on account of the single direction of the emitted beam.

These two types of probes ("TOFD" and "angle transducer") are commercially available, for example from Inetec, to inspect the inner sides of VBP tubes.

They can also be found in recent literature for the inspection of vessel bottom penetrations (Joon Soo Park, et al, 'Development of Automated Nondestructive Inspection System for BMI Nozzles in Nuclear Vessel', Journal of the Korean Society for Nondestructive Testing, Vol. 33, No. 1: 26-33, 2013).

The drawbacks of these two types of probes (angle transducer or TOFD probe) lie in the fact that they only allow a beam of ultrasound waves to be sent into a single area and in a single direction in the weld, as imposed by the dimensions of said probes.

For example, for the TOFD probe this area is imposed de facto by the angles of the wedges on which the angle transducers are positioned and the distance between the transmitter portion and receiver portion. Similarly, for the "angle transducer", the direction of the beam is imposed by the angle of the wedge.

"Multi-element" solutions i.e. having several elements (of immersion type or contact type with flexible wedge or on rigid wedge) are also present in the state of the art for weld inspection from the outside:

example for 'flexible contact': 'Zone Sensitivity Optimization For The Ultrasonic Inspection Of Complex 3D Geometries Using Civa Software', Bastien Chapuis et al, ICNDE 2013;

example for 'contact on rigid wedge': Development And Qualification Of A Procedure For The Mechanized Ultrasonic Examination Of Structural Weld Overlays, V Chardome et al, ICNDE 2013;

example for 'immersion': Development of Ultrasonic And Eddy Current Testing techniques For Curved Structures, T. Miura et al, ICNDE 2013.

However, these devices do not allow inspection of the weld of a VBP having a small angle $\alpha$. For the 'flexible wedge' method, the tight space prevents inspection of the area by flexible wedges. For the 'immersion' or 'contact on rigid wedge' methods, there is both a problem of small clearance and of surface irregularity which varies in three dimensions preventing inspection.

In addition, multi-element solutions of "wedge" type for inspection inside a tube are disclosed in the state of the art, but these characterize devices which do not allow measurement of asymmetric weld defects of VBPs in accordance with the raised technical problem as defined.

Furthermore, they only allow measurement of defects in components having large inner diameters (see for example 8th ECNDT, Barcelona, 17-21 Jun. 2002, Jérôme Poguet et al).

With regard to patent publications, the state of the art on this subject can be illustrated by the following documents: JP 2013217770, JP 2011252759 and FR 2 717 578.

At all events, these prior publications have the following points in common:

Any method and any detection instrumentation operating from the outside does not provide access to the welded joint/tube area, in particular when radii of curvature are the most restrictive. This is notably the case with the devices described in JP2014185895 and WO81/02636.

The solutions allowing detection on the inner side of tubes do not approach the issue of tight space (when the tube is of small diameter), or the asymmetric nature of this weld.

It is the objective of the present invention to overcome the disadvantages detailed in the foregoing and to solve the above shortcoming.

SUMMARY OF THE INVENTION

The present invention therefore relates to a device for inspecting and measuring weld defects in a cylindrical wall such as a wall of a "vessel bottom penetration" of a nuclear reactor, the device comprising an inspection head forming a probe having a proximal end and a distal end along its longitudinal axis (X-X'), and of which a first side called "inner side" is provided with at least one ultrasound wave transducer, wherein:

said inspection head comprises a second side called "outer side" opposite the first side, that has a curved surface in the form of a cylinder fraction, of longitudinal axis parallel to the longitudinal axis (X-X') of the head and with outward facing convexity;

said wave transducer is formed of a series of juxtaposed elements, each element being both a transmitter and receiver, the surface of the series being curved and in the form of a cylinder fraction of same direction as said longitudinal axis (X-X') and with outward facing concavity;

the plane (P1) containing the two end generatrixes of the cylinder fraction of the second side, together with plane (P2) containing the two end generatrixes of said cylinder fraction of the wave transducer, forms a nonzero acute angle β.

According to advantageous, nonlimiting characteristics of this device:

said angle β is approximately 21';

said elements are arranged one behind the other, with a narrow space between each one;

each element is subdivided into several sub-elements distributed in a two dimensional array, so that each subelement has at least one neighbouring sub-element in a longitudinal direction and at least one neighbouring sub-element in a transverse direction;

the device comprises a manipulating pole having said inspection head at the distal end thereof; and the radius of curvature of the series of elements is between 8 and 30 mm, and preferably in the region of 10 mm.

Also, the invention relates to a method for inspecting and measuring weld defects in a cylindrical conduit such as a "vessel bottom penetration" of a nuclear reactor, the method making use of a device according to one of the preceding characteristics.

According to the invention, this method is characterized by the fact that it comprises a step to insert said inspection head inside said cylindrical conduit, this inspection head having an "outer side" with the same radius of curvature as the inner wall of said conduit, a step to apply said outer side against said inner wall, and a step to scan at least part of said inner wall during which said outer side remains in contact with said inner wall.

According to other advantageous, nonlimiting characteristics of this method:

said head is moved in successive longitudinal movements inside said conduit, an angular movement being imparted to this head between each longitudinal movement; and said head is moved in successive angular movements inside the conduit, a longitudinal movement being imparted to this head between each angular movement.

With this combination of characteristics, it is possible to carry out fully operative inspection of a cylindrical VBP wall for example, on the inside of this VBP, in particular because the particular distribution and orientation of the elements allow scanning over a very wide range of angles at a single time.

Throughout the present application, including in the claims, the term translator can be used in lieu and stead of transducer.

BRIEF DESCRIPTION OF THE DRAWINGS

Other characteristics and advantages of the invention will become apparent on reading the following description of one preferred embodiment of the invention. This description is given with reference to the appended drawings in which:

FIGS. 11 to 14 are images showing the amplitude of the signals obtained when using a device of the invention.

DETAILED DESCRIPTION OF THE INVENTION

Figure 10:
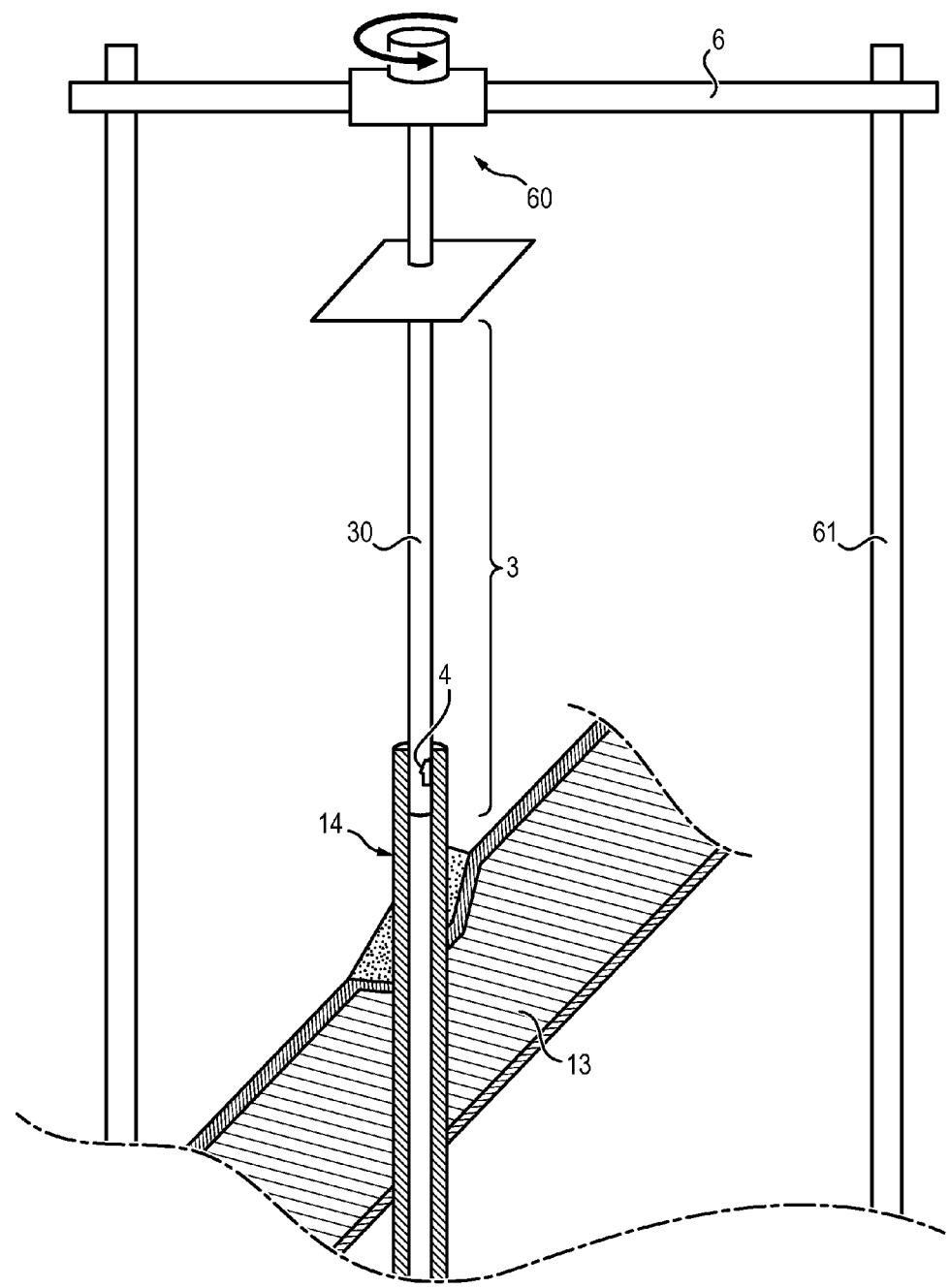
FIG. 10 is a schematic showing instrumentation for implementation of this method.

The device 3 of the invention such as schematically illustrated in its entirety in FIG. 10 essentially comprises a pole 30 at the distal end of which there is an inspection head or probe 4.

By convention, by distal end is meant the end the most distant from an operator positioned on the side of the pole opposite the head 4.

A preferred example of embodiment of the head 4 is given in FIGS. 3 to 6.

In these Figures, X-X' is the longitudinal axis of the head and EP and ED are the proximal and distal ends respectively. In one nonillustrated embodiment these ends could be reversed.

According to the invention, the inspection head 4, preferably made of electrically insulating material such as that known under the trade name "REXOLITE", comprises a first side called "inner side" 42 and a second side 43 called "outer side" opposite the first side.

Figure 4:
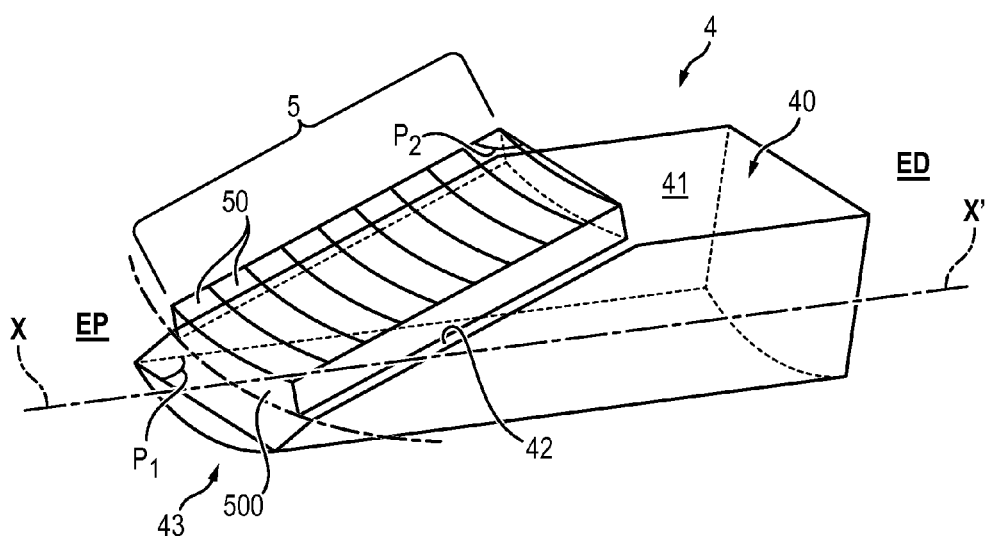
FIG. 4 is a perspective view of the inspection head shown in FIG. 3, here illustrated in a turned position at 180°.
Figure 6:
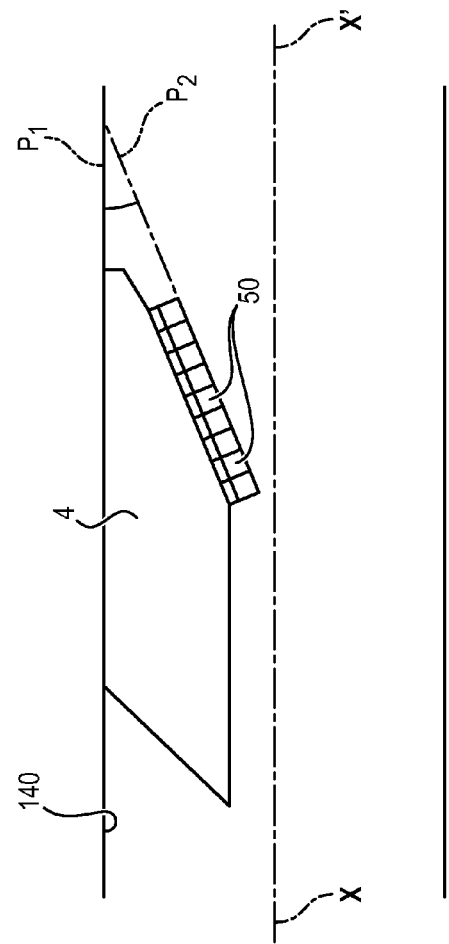
FIGS. 5 and 6 are respective front and side views of the inspection head in FIG. 4, in position within a VBP.
Figure 5:
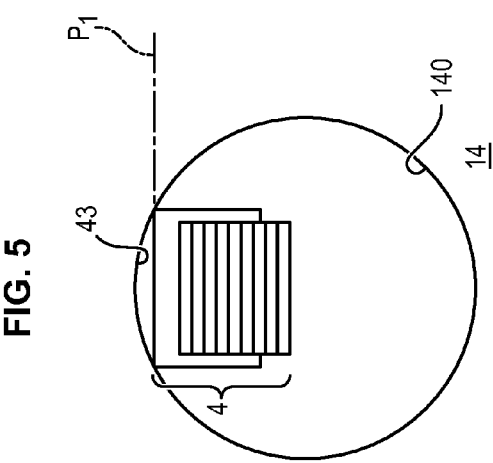

This second side 43 has a curved surface in the form of a cylinder fraction having a longitudinal axis parallel to the longitudinal axis X-X' of the head and with outward facing convexity. In FIG. 4, P1 is the plane containing the two end generatrixes of the cylinder fraction of the second side.

The radius of curvature of this curved surface as will be seen below, is equal to the radius of curvature of the cylindrical conduit it is desired to inspect.

The first side 42 only occupies a portion of the inner surface of the head and continues in the direction of the proximal end EP via a planar platform 40.

The first side 42 receives an ultrasound wave transducer formed of a series of 5 juxtaposed transmitter/receiver elements 50, the series having a curved surface in the form of a cylinder fraction having the same direction as the longitudinal axis X-X' and having outward facing concavity. Reference P2 is the plane containing the two end generatrixes of said cylinder fraction of this wave transducer. As an indication, the radius of curvature of the series 5 is between 8 and 30 mm and more preferably in the region of 10 mm.

According to the invention, these two planes P1 and P2 together form a nonzero acute angle β.

In particularly preferred manner, this angle is approximately 21°.

Figure 3:
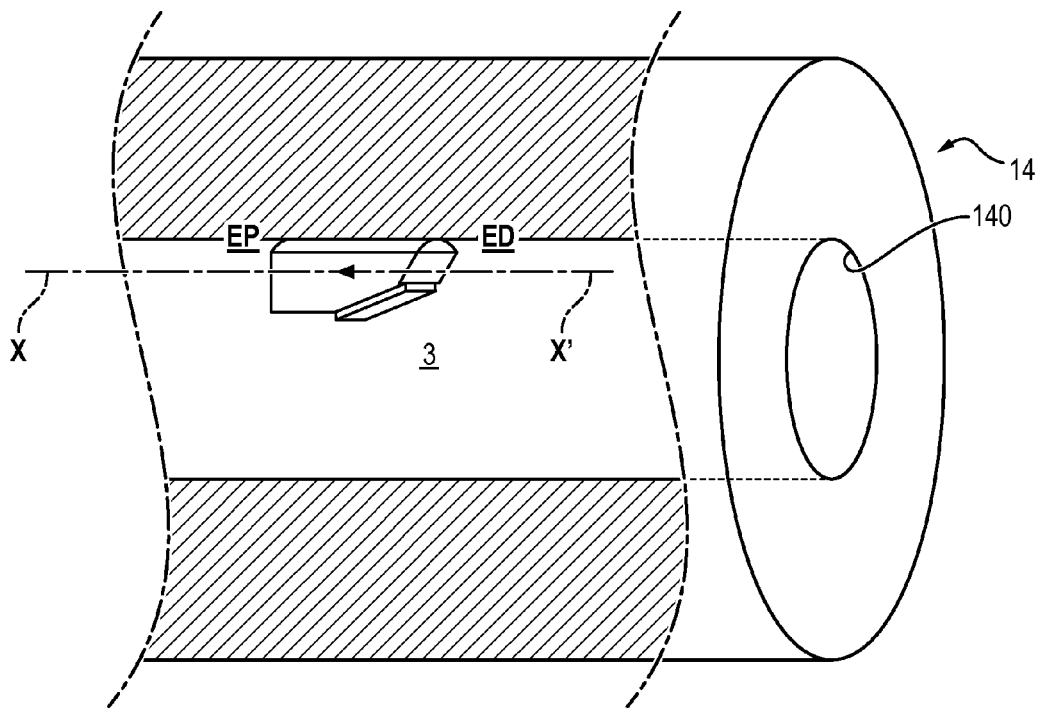
FIG. 3 is a simplified perspective view of the inspection head of a device conforming to the present invention in position within a VBP to be inspected.

In the embodiment shown in FIGS. 3 and 4, the elements 5 are arranged one behind the other with a narrow space between each one.

Figure 7:
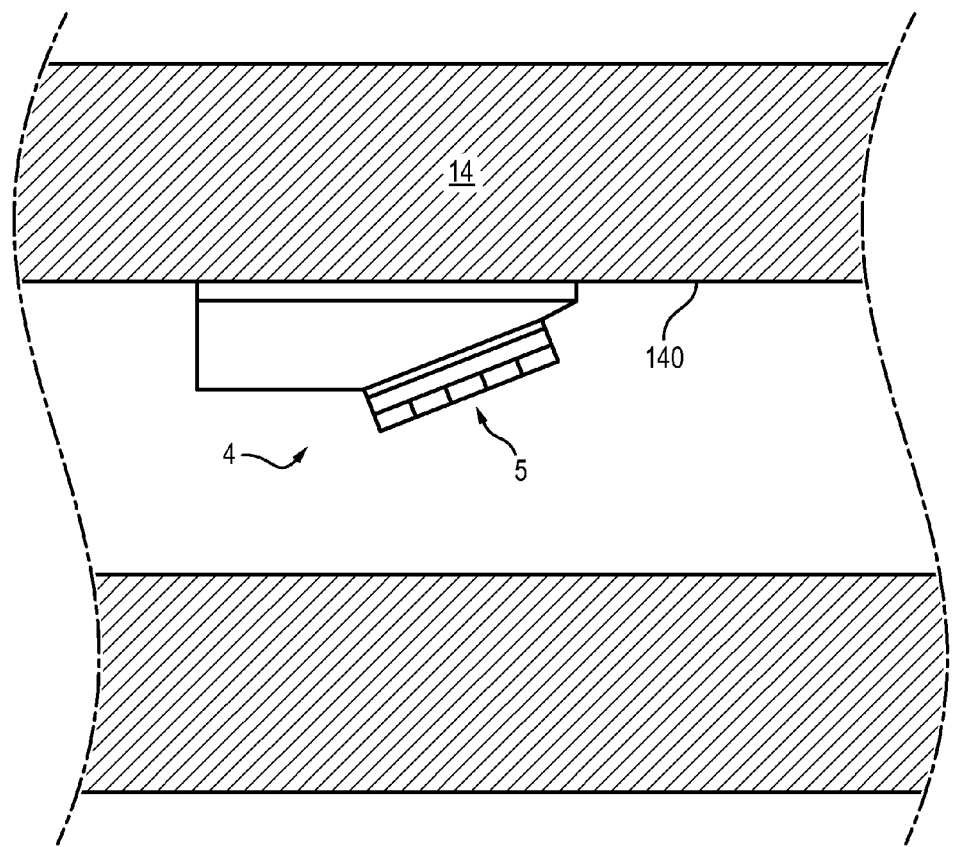
FIG. 7 is a similar view to FIG. 6 of a variant of embodiment of the inspection head.
Figure 8:
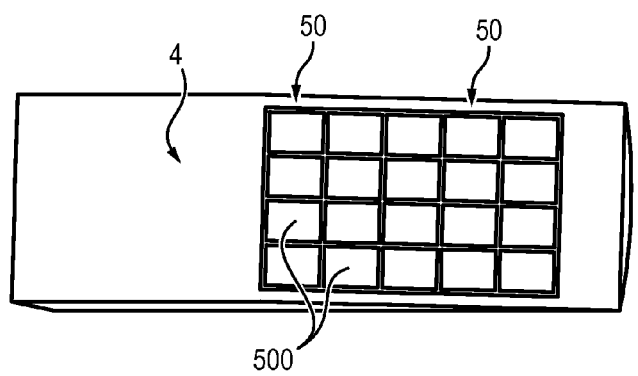
FIG. 8 is an underside view of the head in FIG. 7.

However, and as shown in FIGS. 7 and 8, each element 50 can be subdivided into several sub-elements 501 distributed in a two-dimensional array, so that each sub-element 501 comprises at least one neighbouring subelement in a longitudinal direction and at least one neighbouring sub-element in a transverse direction.

These views are merely intended to be illustrative. Therefore, for reasons of simplification the curvature of the elements 5 is not illustrated.

At all events, each sub-element 501 is both a transmitter and a receiver.

According to the embodiment shown in FIG. 4, at least eight aligned elements 50 are driven by electronics so as to excite the elements at particular determined instants as a function of the form it is desired to impart to the ultrasound beam generated by these elements.

Angle β is about 21° to facilitate coverage of the angle ranges e.g. of the order of −20°, 70°. As will be seen below, the application of delayed excitation of the elements 50 already allows deflection of the beams at different angles, but in imperfect manner. With angle β it is possible to overcome this problem.

Figure 1:
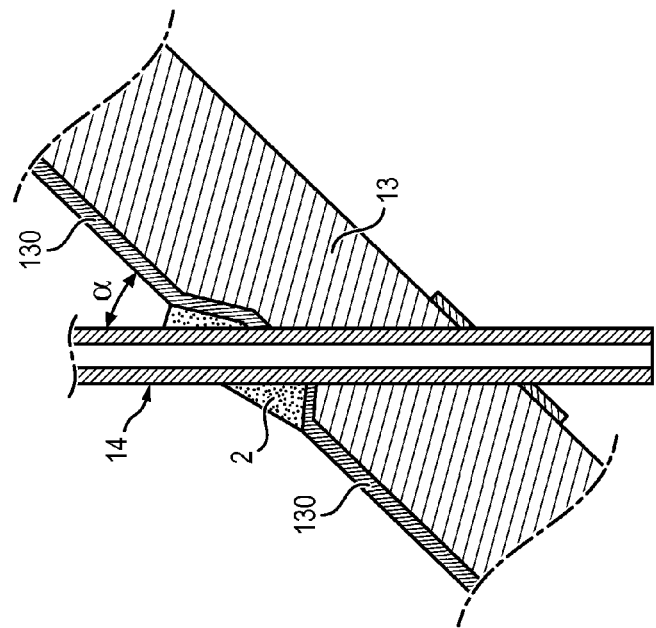
FIG. 1 and FIG. 2, as mentioned above, illustrate the state of the art known to the present applicant.
Figure 2:
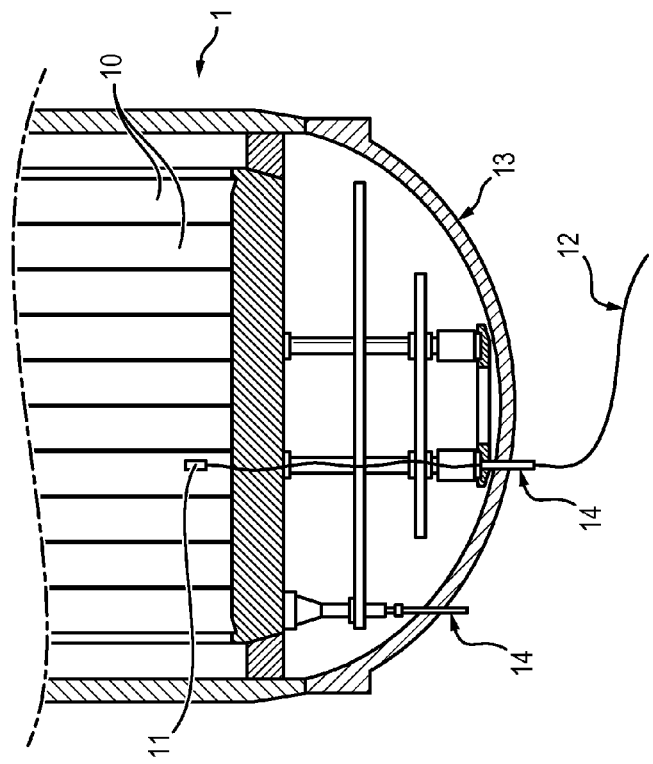

The reference frame of the aforementioned angle range is the normal to the axis of the VBP tube, angle +90° being directed downwardly, with reference to FIG. 2.

The dimensions of the head 4 (including the casing and cabling of the elements 5) must be smaller than the inner diameter of the VBP tube. Wave breakers, not illustrated, are advantageously positioned ahead (i.e. on the side of the proximal end EP) of the head 4 so that rebound echoes occurring inside the head do not mask the echoes sent by the defects to be inspected in the VBP weld.

The operating frequency of the elements 50 is selected as a function of the depth (in relation to the sensor) of the defects it is desired to detect. For defects in the welded area of a VBP, a frequency of more or less 3 MHz is used.

Inspection of defects of unknown orientation and position in the welded area is advantageously made possible by automation of inspection.

For example, and as illustrated in FIG. 10, the device 3 of the invention comprises a pole 30 at the distal end of which there is the head 4 moved in self rotation by a motor 60, itself mounted on a rail 6, the latter sliding along a frame 61.

It is thus possible to move the device 3 inside the VBP 14 both in the direction of the axis of the VBP 14 and in rotation about this same axis.

In addition, for each position of the head 4, a series of ultrasound pulses is transmitted, each pulse allowing illumination of the medium in different directions. Therefore, contrary to the prior art, it is possible to detect defects of variable orientation having recourse to single set of elements 50.

Implementation—Example of Embodiment

A piezoelectric transducer operating at a frequency of 3 MHz (bandwidth at 6 dB, 55% of the central frequency) with nine elements 50 is mounted on a head such as the one in FIG. 4, with an angle β of 21°.

The elements 50 are of generally rectangular shape (dimensions 6 mm by 1.15 mm), aligned one behind the other, with a space of 0.15 mm between two elements. The head 4 is in Rexolite (registered trademark). Wave breakers not illustrated are positioned ahead of the head 4 i.e. on the side of its proximal end. The piezoelectric elements 50 are machined to impart a curved shape thereto with a radius of curvature of 10 mm.

In this example of embodiment, the head 4 is integrated in a metallic casing of cylindrical shape facilitating guiding and holding thereof close against the inner wall 140 of the VBP 14.

When set in operation, electronic apparatus of "M2M" trade mark is used to excite transmission by the piezoelectric elements 50 and to record the signals received by these same elements 50. The electronics are guided by "multi2000" software.

This software computes time delays to be applied to the excitations of the different elements 50 of the transducer, as a function of the shape it is desired to impart to the emitted ultrasound beam. In this application, the time delays are computed so that the ultrasound beam of longitudinal waves is deflected by an angle of between −20° et 70°, with a pitch of 2°.

Figure 9:
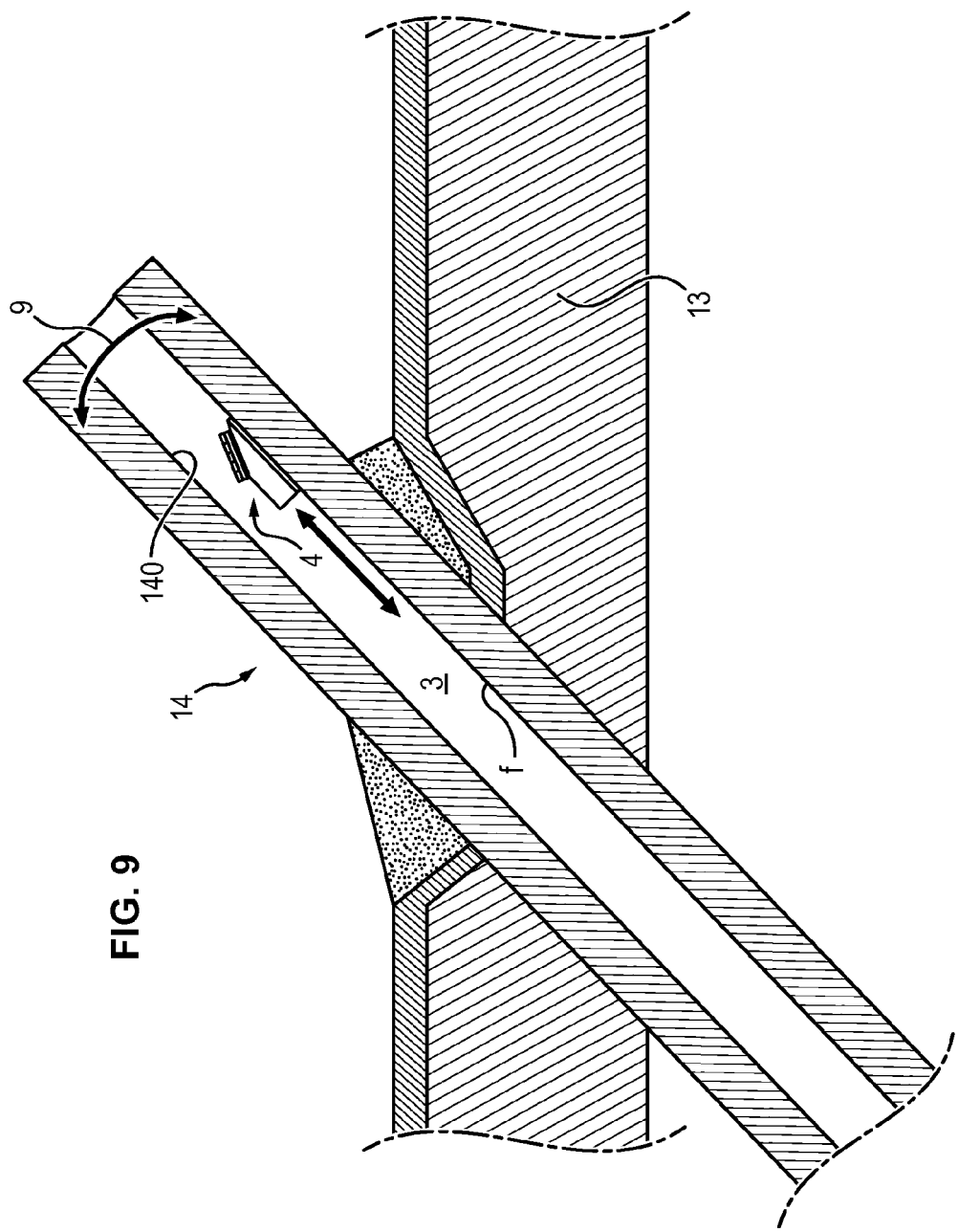
FIG. 9 is a schematic intended to illustrate how to implement the method of the invention.

The head 4 is moved along the axis of the VBP tube 14 (so-called 'scanning' axis as indicated by the arrow f in FIG. 9). Signals are transmitted and recorded every 0.5 millimetres.

Measurement is repeated after successive rotations of the head 4 about the axis of the tube with a pitch of 2° (arrow g in FIG. 9). This makes it possible to cover the entire welded area to be inspected.

Movement of the probe is ensured by a motorised arm of "Micro-contrôle" trade mark driven by a controller of same trade mark (reference ITL09).

The measured signals are then post-processed using "CIVA" software. This allows images to be obtained representing the amplitude of the received signals as per a colour code, as a function either of the position of the head 4 along the scanning axis, or of the position of the head 4 according to the rotation value or as a function of the applied ultrasound pulse (i.e. as a function of the deflection angle of the ultrasound beam). Analysis of these images allows deducing of the presence of defects in the VBP 14.

This procedure is illustrated below.

A model is considered representing a welded VBP in every aspect comprising two artificial defects (obtained by electro-erosion) called 'circumferential' defects in the welded area.

These are defects called EE1 and EE2. The data are analysed using processing software (here "CIVA" software) which allows data to be represented in the form of different types of images.

Figure 11:
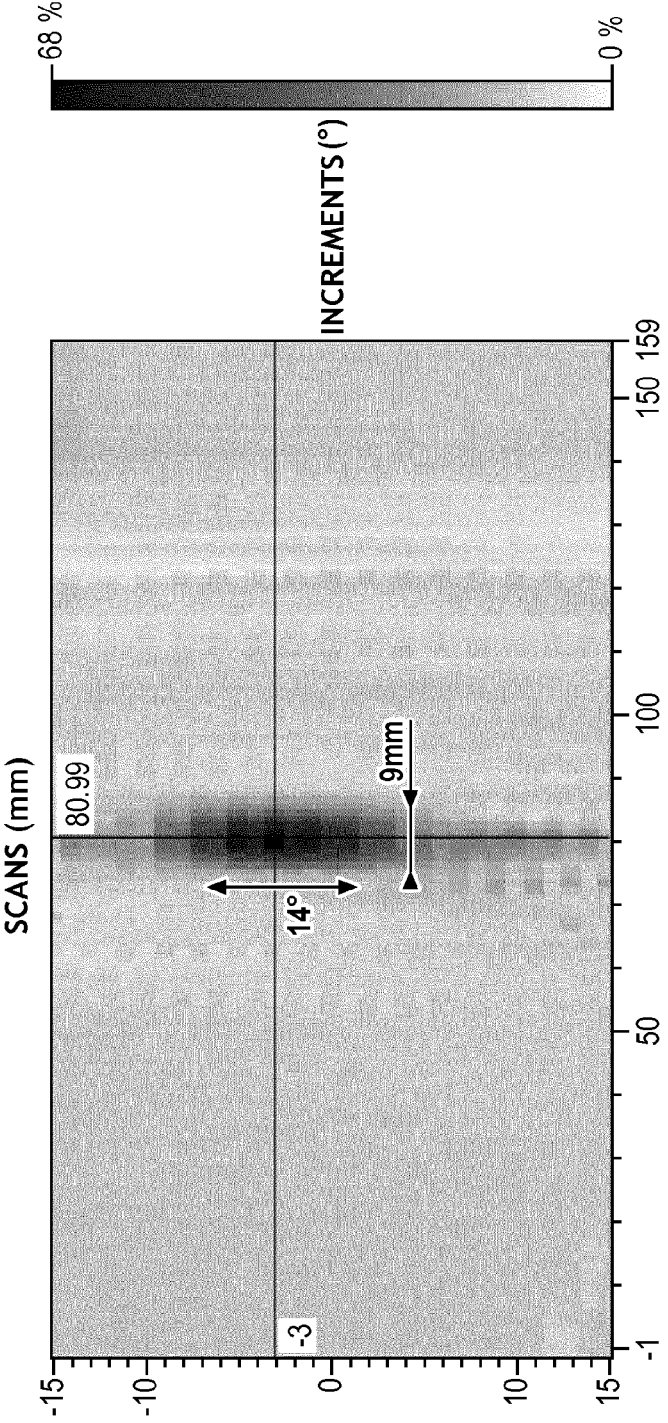
Figure 12:
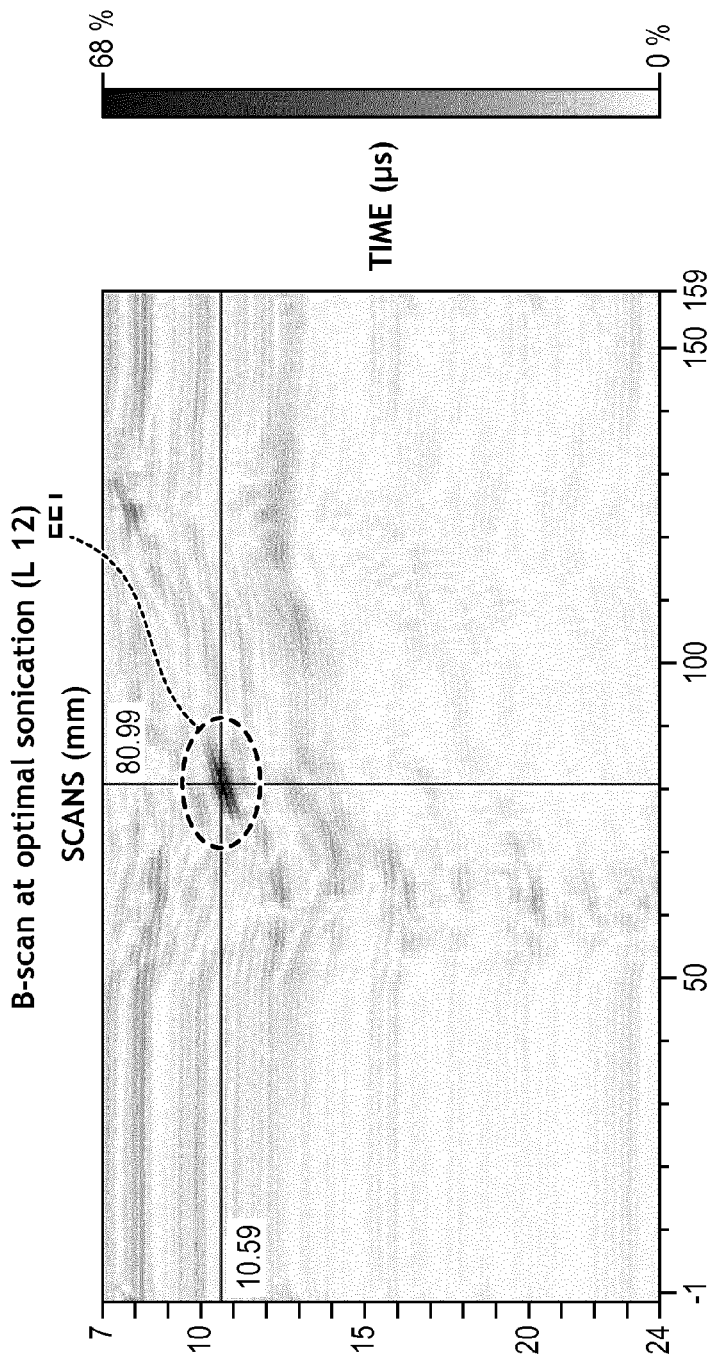
Figure 13:
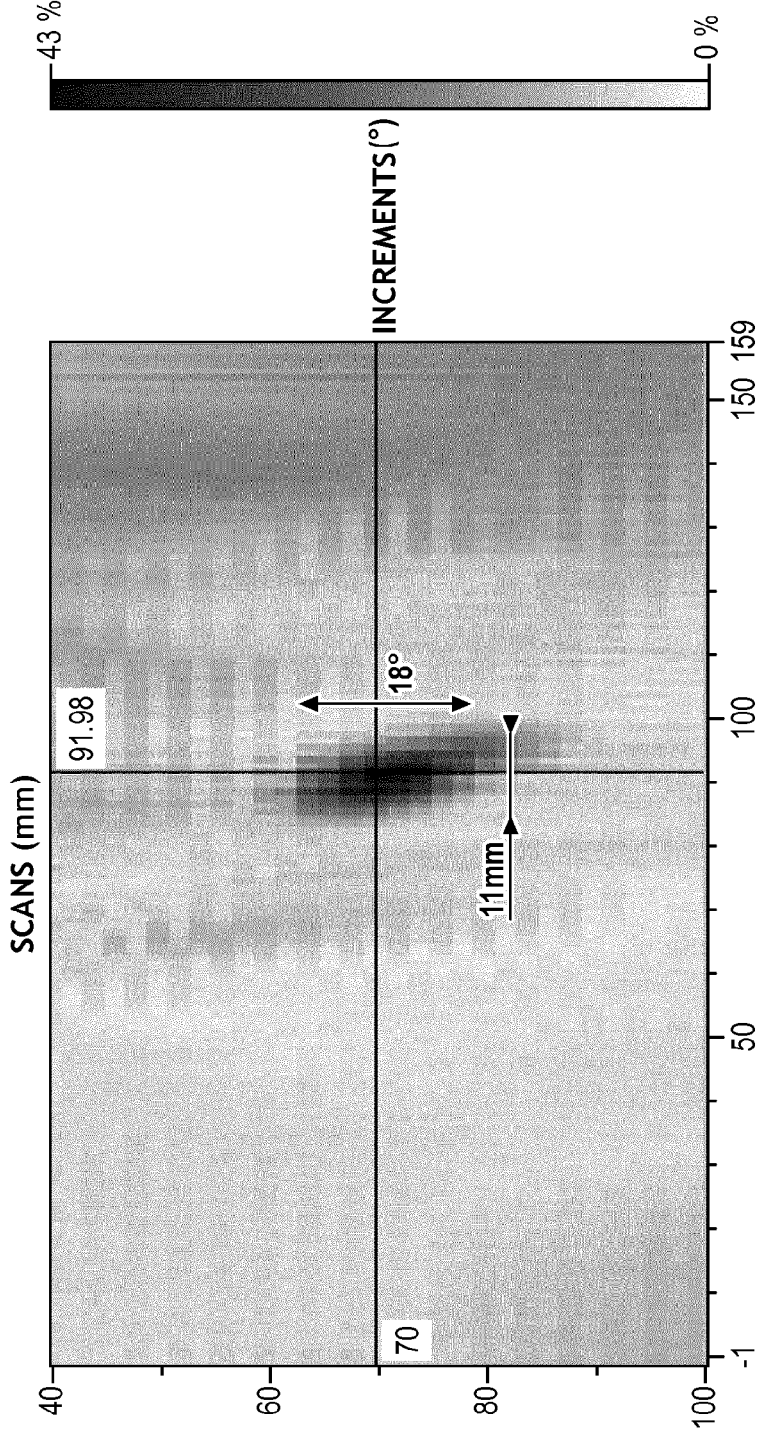

In particular so-called 'C-scan' images are seen which represent the amplitude received by the transducer in colour code (variations in grey shade in FIG. 11 et seq.) as a function—vertically—of the position of the head 4 in rotation, and—horizontally—as a function of the scanning axis.

Post-processing then involves observing the images of 'C-scan' type for different angles of sonication and determining which sonication angle allows the obtaining of an indication of maximum amplitude received from a defect.

More specifically, the following steps are carried out using CIVA software (however any other software can be used to process these data):

For all sequences and all sonications, selection of a time window excluding so-called 'permanent' echoes due to reflections in the wedge;

Also, selection of the range of scanning values (along the vertical axis) of the area corresponding to the weld (omission of the area corresponding to the tube alone via observation of rebound echoes on the tube with a sonication at 0° (i.e. perpendicular to the axis of revolution of the tube);

Next, observation of the C-scan type image (maximum amplitude over time at each scanning pitch and increment, for one determined sonication), and changes as a function of the chosen sonication. When an echo appears in the welded area in the C-scan, the shape of this echo can be seen in the B-scan;

The increment is then selected corresponding to the observed echo, and the B-scan corresponding to this sonication and to this increment is displayed;

To maximise the signal-to-noise ratio, it is possible to fine-tune the choice of angle of sonication by selecting the previously obtained scanning position and increment and then observing the so-called S-scan which represents the signal measured as a function of time and as a function of sonication angle for the fixed scanning and increment;

The choice of time limits, scanning limits and even range of sonication angles can also be based on CIVA simulation. For a set of potential defects in the welded area, this allows computing of the arrival times of the echoes from these defects for each angle of sonication, and an order of magnitude of the amplitude thereof. This can be used to support analysis of experimental signals.

It can also be mentioned that parasitic echoes causing most of the noise correspond to geometric echoes (rebound off the bottom of the tube). Therefore, simulation (or measurement on a gauge block) first allows identification of the type of these echoes on blind inspection of a new component of same geometry, and secondly image processing (not tested here) of wavelet filtering type would allow suppression of these echoes to the benefit solely of defect echoes.

This data analysis shows that the defect EE1 is detected when the beam is deflected by 12°, and defect EE2 is detected with a deflection of 26°. The images below show the 'C scan' mage obtained and the so-called 'B-scan' image, the latter representing the amplitude of the signal as a function of time (vertical axis) and of the position of the head 4 along the scanning axis (horizontal axis), the rotation position being selected so that the signal from the defect is of maximum amplitude.

Defects EE1 and EE2 are therefore very well detected by means of the presence of an echo (dark spot in the images) clearly distinguished from the other 'noise' signals.

Therefore, by implementing the method just described that proceeds by scanning, preferably automated, the entire surface to be inspected and by applying "multi-pulses" i.e. ultrasound emissions spaced over time, optimal quality of defect detection is obtained even when the number of transducer elements 50 is reduced. This particularly applies when they are nine in number as illustrated in the Figures.

With adapted processing software such as the one cited above, echoes can be evidenced which would have been lost within the noise of the structure without visualisation of the spatial dimension of the measured echoes.

The invention claimed is:

1. A device for inspecting and measuring weld defects in a cylindrical wall of a cylindrical conduit, comprising:
   an inspection head forming a probe having a proximal end and a distal end along its longitudinal axis, and of which a first side called "inner side" is provided with at least one ultrasound wave transducer, wherein:
      the inspection head comprises a second side, called "outer side" opposite the first side that has a curved surface in the form of a cylinder fraction, with a second longitudinal axis parallel to the longitudinal axis of the inspection head, and wherein the curved surface of the second side has outward facing convexity;
      the wave transducer is formed of a series of juxtaposed elements, each element being both a transmitter and receiver, wherein a surface of the series is curved and in the form of a cylinder fraction having a third longitudinal axis that is co-planar with the longitudinal axis of the inspection head, and wherein the surface of the series has outward facing concavity; and
      a first plane parallel to the first side and a second plane parallel to the second side, wherein an angle between the first plane and the second plane is a nonzero acute angle β.

2. The device according to claim 1, wherein the angle β is approximately 21°.

3. The device according to claim 1, wherein the elements of the series are arranged one behind the other.

4. The device according to claim 1, wherein each element of the series is subdivided into several sub-elements distributed in a two-dimensional array, so that each sub-element has at least one neighbouring sub-element in a longitudinal direction and at least one neighbouring sub-element in a transverse direction.

5. The device according to claim 1, further comprising a manipulating pole having the inspection head at a distal end thereof.

6. The device according to claim 1, wherein a radius of curvature of the series of elements is between 8 and 30 mm.

7. The device according to claim 2, wherein the elements of the series are arranged one behind the other.

8. The device according to claim 6, wherein the radius of curvature of the series of elements is 10 mm.

9. A method for inspecting and measuring weld defects in a cylindrical wall of a cylindrical conduit, comprising:
   providing a device comprising an inspection head forming a probe having a proximal end and a distal end along its longitudinal axis, and of which a first side called "inner side" is provided with at least one ultrasound wave transducer, wherein:
      the inspection head comprises a second side, called "outer side" opposite the first side that has a curved surface in the form of a cylinder fraction, with a second longitudinal axis parallel to the longitudinal axis of the inspection head, and wherein the curved surface of the second side has outward facing convexity;

the wave transducer is formed of a series of juxtaposed elements, each element being both a transmitter and receiver, wherein a surface of the series is curved and in the form of a cylinder fraction having a third longitudinal axis that is co-planar with the longitudinal axis of the inspection head, and wherein the surface of the series has outward facing concavity; and a first plane parallel to the first side and a second plane parallel to the second side, wherein an angle between the first plane and the second plane is a nonzero acute angle $\beta$;

inserting the inspection head inside the cylindrical conduit, wherein the outer side of the inspection head has a same radius of curvature as an inner wall of the cylindrical conduit;

applying the outer side against the inner wall; and scanning at least part of the inner wall during which the outer side remains in contact with the inner wall.

10. The method according to claim 9, further comprising:
moving the inspection head in successive longitudinal movements inside the cylindrical conduit, and moving the inspection head in an angular movement between each longitudinal movement.

11. The method according to claim 9, further comprising:
moving the inspection head in successive angular movements inside the cylindrical conduit, and moving the inspection head in a longitudinal movement between each angular movement.

* * * * *